United States Patent [19]
Fujita et al.

[11] 4,303,210
[45] Dec. 1, 1981

[54] TAPE DRIVE DEVICE

[75] Inventors: Masahiko Fujita, Yokohama; Kenji Hayashi, Kamakura; Kazutoshi Konno, Tokyo, all of Japan

[73] Assignee: Hitachi, Ltd., Tokyo, Japan

[21] Appl. No.: 101,270

[22] Filed: Dec. 7, 1979

[30] Foreign Application Priority Data

Dec. 13, 1978 [JP] Japan .................................. 53-153154
Nov. 30, 1979 [JP] Japan .................................. 54-154383

[51] Int. Cl.³ .......................... G03B 1/04; G11B 15/32
[52] U.S. Cl. ..................................... 242/200; 242/68.1
[58] Field of Search ................................. 242/197–204, 242/68.3, 54 R, 68.1; 191/12.2 R, 12.2 A, 12.4

[56] References Cited

U.S. PATENT DOCUMENTS

| | | | |
|---|---|---|---|
| 2,487,395 | 11/1949 | Strang | 242/54 R |
| 3,417,938 | 12/1968 | Markakis et al. | 242/200 |
| 3,739,998 | 6/1973 | Esashi et al. | 242/68.3 |

*Primary Examiner*—Leonard D. Christian
*Attorney, Agent, or Firm*—Craig and Antonelli

[57] ABSTRACT

A tape drive device in which a cavity is formed in a reel hub provided for supplying or taking up a tape-shaped information recording and reproducing medium such as a magnetic tape or a film. A motor including a rotor unit and a stator unit is partly or wholly received within the cavity of the reel hub, and the rotating force generated by the rotor part of the motor is transmitted directly or through a reduction gearing to the reel hub to cause rotation of the reel hub.

11 Claims, 14 Drawing Figures

TAPE DRIVE DEVICE

BACKGROUND OF THE INVENTION

1. Field of the Invention

This invention relates to a tape drive device for supplying and taking up a tape-shaped information recording and reproducing medium such as a magnetic tape or a film.

2. Description of the Prior Art

It is strongly demanded to reduce the volume, thickness and weight of information recording and reproducing apparatus, for example, cassette tape recorders, video tape recorders, 8-mm cinecameras, etc. for the purpose of saving the required materials and also for the purpose of improving the portability.

A tape-shaped information recording and reproducing medium such as a magnetic tape or a film (referred to hereinafter merely as a tape) used in these information recording and reproducing apparatus is generally driven at a predetermined constant speed by a capstan and a pinch roller of a tape drive device. A hub for a take-up reel and a hub for a supply reel are provided to take up the tape travelling at the constant speed and to supply the tape at a high speed. In another type of such a tape drive device, the capstan and the pinch roller are eliminated, and the pair of reel hubs used for the take-up and supply of the tape are utilized to feed the tape at the constant speed and to feed the tape at the high speed. In any one of the known tape drive devices, a motor is provided as a source of power for driving the capstan or the reel hub pair. However, due to the fact that the motor employed hitherto as the drive power source has a considerable height and a considerable volume, and various mechanisms including a power transmission mechanism including a belt or the like, a reel hub slip mechanism and an actuating mechanism performing constant-speed feeding, fast forwarding, rewinding and other functions are also required for the tape drive, these parts occupy very large proportions of the volume, height and weight of the information recording and reproducing apparatus. It has therefore been unable to meet the demand for the reductions in the volume, thickness and weight of the information recording and reproducing apparatus.

SUMMARY OF THE INVENTION

It is therefore a primary object of the present invention to provide a novel and improved tape drive device for use in such an information recording and reproducing apparatus, in which the structure of the reel hubs and the motor indispensably required for the tape drive is improved so as to contribute to the desired reductions in the volume, thickness and weight of the information recording and reproducing apparatus.

The novel and improved tape drive device according to the present invention is featured by the fact that a cavity is formed in each of the reel hubs driving a tape, and a motor including a rotor unit and a stator unit is disposed within the cavity of each of the reel hubs, so that the rotating force generated by the rotor unit of the motor disposed within the cavity of each of the reel hubs is transmitted to the associated reel hub to drive the same.

In accordance with the present invention, there is provided a tape drive device including a reel hub for supplying or taking up a tape-shaped information recording and reproducing medium such as a magnetic tape or a film, the device comprising at least a reel hub formed with a cavity thereinside, a motor received at least partly within the cavity formed in the reel hub, the motor including a rotor unit and a stator unit, and coupling means for transmitting to the reel hub the rotating force generated by the rotor unit of the motor received within the cavity of the reel hub.

DETAILED DESCRIPTION OF THE PREFERRED EMBODIMENTS

The present invention will now be described in detail with reference to the drawings showing an application of the present invention to a cassette tape recorder, by way of example.

Figure 1:
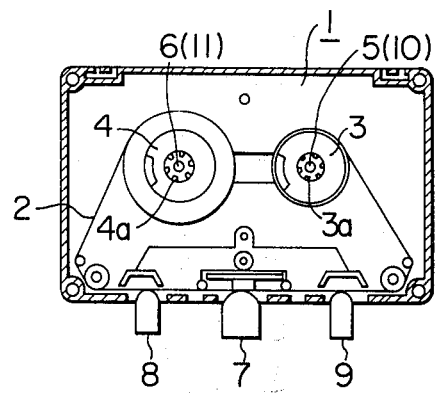
FIG. 1 is a plan view showing a tape drive arrangement in a cassette tape recorder when the tape drive device according to the present invention is applied to the cassette tape recorder.

Referring to FIG. 1, a tape cassette 1 well known in the art includes a tape 2 trained around a take-up reel 3 and a supply reel 4. A hub 5 for the take-up reel 3 engages with teeth 3a projecting from the take-up reel 3, and a hub 6 for the supply reel 4 engages with teeth 4a projecting from the supply reel 4. In the present invention, motors 10 and 11 described later are disposed within these reel hubs 5 and 6 respectively. Reference numerals 7, 8 and 9 designate a recording and reproducing head, an erase head and a tape speed sensor head respectively.

Figure 2:
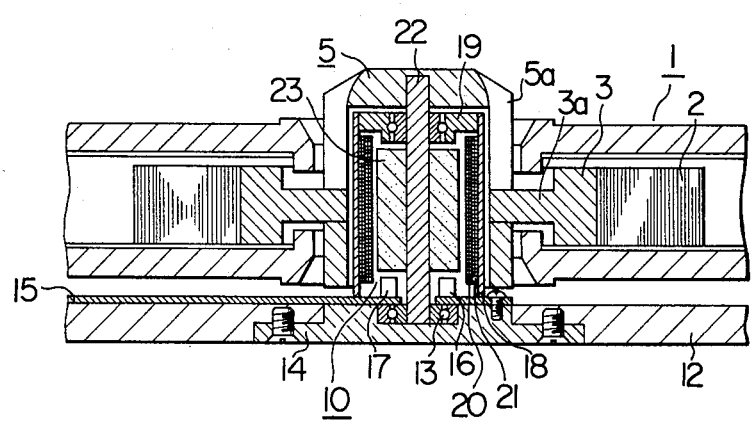
FIG. 2 is an enlarged longitudinal sectional view of part of a first embodiment of the tape drive device according to the present invention.
Figure 3:
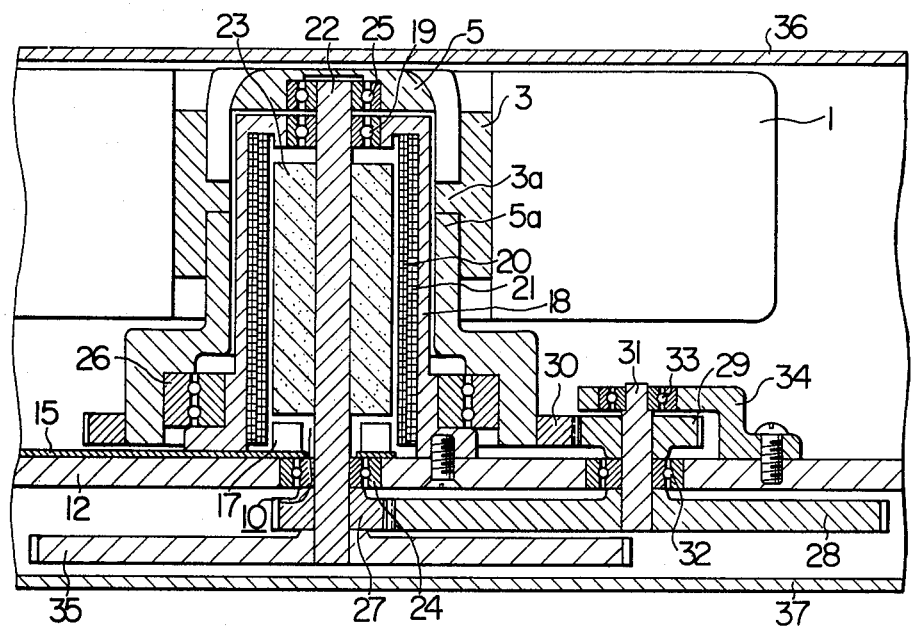
FIG. 3 is an enlarged longitudinal sectional view of part of a second embodiment of the tape drive device according to the present invention.

The structure of the motor disposed within each of the reel hubs 5 and 6 will be described with reference to FIGS. 2 and 3 showing a first embodiment and a second embodiment respectively of the tape drive device according to the present invention. Each of FIGS. 2 and 3 shows the internal structure of one of the reel hubs. The principal difference between the embodiment shown in FIG. 2 and that shown in FIG. 3 is that the rotating force generated by the motor 10 is directly transmitted to the reel hub 5 in the former, whereas the rotating force generated by the motor 10 is transmitted to the reel hub 5 through a reduction gearing composed of a plurality of gears in the latter. However, the motors 10 in these two embodiments are basically the same in structure.

The embodiment shown in FIG. 2 will be described at first. Referring to FIG. 2, a yoke holder 14 having a bearing 13 fixed therein is secured in a mating opening of a chassis 12 by screws, and a flexible circuit board 15 having a pair of spaced Hall elements 16 and 17 fixedly mounted thereon is secured to the upper surface of the yoke holder 14 and to the upper surface of the chassis 12 as by bonding. A hollow cylindrical yoke 18 made of a magnetic material is secured to the yoke holder 14 by screws. Another bearing 19 is fixedly mounted in the upper end opening of the yoke 18, and generally annular a drive coil assembly 20 of one phase and another generally annular drive coil assembly 20 of another phase are fixedly mounted in concentric relation on the inner wall surface of the yoke 18. A hollow cylindrical magnet 23 magnetized to be formed with a plurality of magnetic poles at its peripheral surface is fixedly mounted on a shaft 22 which is journalled at its opposite end portions in the bearings 13 and 19 respectively. Secured to the upper end of this shaft 22 is the take-up reel hub 5 provided with an engaging portion 5a adapted for meshing engagement with the teeth 3a projecting from the take-up reel 3 in the tape cassette 1. The Hall elements 16, 17 and the drive coil assemblies 20, 21 are electrically connected to the flexible circuit board 15. The operation of the motor 10 will be described in detail later, and its fundamental operation will only be briefly described herein. The fundamental operation is such that the magnet 23 generates a rotating force for driving the shaft 22 in response to the application of drive voltages to the drive coil assemblies 20 and 21 from a power source (not shown) through the flexible circuit board 15.

In summation, in the embodiment shown in FIG. 2, a cavity is formed in the reel hub 5, and the motor 10 comprising the stator unit including the yoke 18 and the drive coil assemblies 20 and 21 as its principal components and the rotor unit including the magnet 23 and the shaft 22 at its principal components is disposed within this cavity of the reel hub 5.

The motor 10 shown in FIG. 2 is assembled by the following steps:

I (1) The bearing 13 is press-fitted in the yoke holder 14.

(2) The flexible circuit board 15 having the Hall elements 16 and 17 fixedly mounted thereon is secured to the upper surfaces of the yoke holder 14 and chassis 12 by bonding.

II (1) The bearing 19 is press-fitted in the upper end opening of the yoke 18.

(2) The drive coil assemblies 20 and 21 are fixedly mounted in concentric relation on the inner wall surface of the yoke 18. (The stator unit is completed.)

III

The shaft 22 is press-fitted in the magnet 23. (The rotor unit is completed.)

IV

The upper end portion of the shaft 22 is journalled in the bearing 19.

V (1) The lower end of the shaft 22 is journalled in the bearing 13.

(2) After the Hall elements 16, 17 and the drive coil assemblies 20, 21 are positioned at the required relative positions, the yoke 18 is secured to the yoke holder 14 by the screws.

(3) The external ends of the leads of the drive coil assemblies 20 and 21 are connected to the flexible circuit board 15. (The motor 10 is completed).

VI (1) The flexible circuit board 15 is flexed, and the yoke holder 14 carrying the motor 10 completed in the step V is inserted in the mating opening of the chassis 12 from beneath and is then secured in the opening of the chassis 12 by the screws.

(2) The reel hub 5 is press-fitted on the upper end of the shaft 22.

(3) The flexible circuit board 15 is secured to the upper surfaces of the yoke holder 14 and chassis 12 by bonding.

The second embodiment of the present invention will now be described with reference to FIG. 3. The fundamental structure and operation of the motor in the embodiment shown in FIG. 3 are the same as those of the motor in the embodiment shown in FIG. 2. The motor 10 in the embodiment shown in FIG. 3 is so constructed that the rotating force generated by the rotor unit is transmitted from the shaft 22 to the reel hub 5 through a reduction gearing composed of a train of four gears 27, 28, 29 and 30 in order to improve the current efficiency of the motor 10, whereas the motor 10 in the embodiment shown in FIG. 2 is so constructed that the rotating force generated by the rotor unit is transmitted directly from the shaft 22 to the reel hub 5. In the embodiment shown in FIG. 3, therefore, the shaft 22 is coupled to the reel hub 5 through a bearing 25, and another bearing 26 is interposed between the yoke 18 and the reel hub 5. The improvement in the current efficiency of the motor 10 will be described later.

Any detailed description of the motor 10 shown in FIG. 3 is unnecessary because the fundamental structure and operation of the motor 10 in the embodiment shown in FIG. 3 are the same as those of the motor 10 in the embodiment shown in FIG. 2.

The device shown in FIG. 3 is assembled by the following steps:

I (1) The bearing 25 is press-fitted in the cavity of the reel hub 5.

(2) The ring-shaped gear 30 is press-fitted on the outer wall surface portion at the lower end of the reel hub 5.

II (1) The bearing 19 is press-fitted in the upper end opening of the yoke 18, and the bearing 26 is press-fitted on the outer wall surface portion at the lower end of the yoke 18.

(2) The drive coil assemblies 20 and 21 are fixedly mounted in concentric relation on the inner wall surface of the yoke 18. (The stator unit is completed.)

III

The completed stator unit is inserted into the cavity of the reel hub 5. (The reel hub 5 is coupled to the yoke 18 through the bearing 26.)

IV (1) A bearing 24 is press-fitted in an opening of the chassis 12, and another bearing 32 is also press-fitted in another opening of the chassis 12 at a position beneath a sub-chassis 34.

(2) The flexible circuit board 15 having the Hall elements 16 and 17 fixedly mounted thereon is secured to the upper surface of the chassis 12 by bonding.

(3) The shaft 22 is press-fitted in the magnet 23 to complete the rotor unit and is then journalled at its lower end portion in the bearing 24.

(4) While positioning the drive coil assemblies 20 and 21 at the required positions relative to the Hall elements 16 and 17 mounted on the flexible circuit board 15 secured to the chassis 12, the stator unit is mounted on the shaft 22, and the yoke 18 is secured to the chassis 12 by the screws.

(5) The external ends of the leads of the drive coil assemblies 20 and 21 are connected to the flexible circuit board 15. (The motor 10 is completed.)

V (1) The gear 27 is press-fitted on the lower end portion of the shaft 22.

(2) The gear 28 is press-fitted on the lower end of a shaft 31, and this shaft 31 is journalled at its middle portion in the bearing 32. (The gear 27 is engaged by the gear 28.)

(3) The gear 29 is press-fitted on the upper end portion of the shaft 31. (The gear 29 is engaged by the gear 30.)

(4) The sub-chassis 34 having a bearing 33 press-fitted in an opening thereof is so mounted that the upper end of the shaft 31 is journalled in the bearing 33, and this sub-chassis 34 is then secured to the chassis 12 by screws.

(5) A flywheel 35 is press-fitted on the lower end of the shaft 22.

In FIG. 3, the numerals 36 and 37 designate a front panel and a rear panel respectively.

The method of making the drive coil assemblies 20 and 21 will be described with reference to FIGS. 4, 5 and 6. As described hereinbefore, the magnet 23 in the rotor unit is magnetized to be formed with a plurality of, for example, six circumferentially spaced magnetic poles. In the present invention, the Hall elements 16, 17 and the drive coil assemblies 20, 21 corresponding to the two phases are provided so that, at whatever position of the magnet 23, the drive current can be necessarily supplied to one of the drive coil assemblies 20 and 21 thereby necessarily generating the rotating torque at the rotor unit.

Figure 4A:
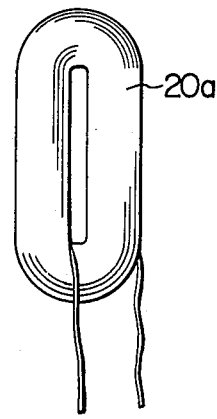
FIGS. 4A, 4B, 5A, 5B, 6A and 6B are enlarged detail views of coils employed in the tape drive device according to the present invention.
Figure 5A:
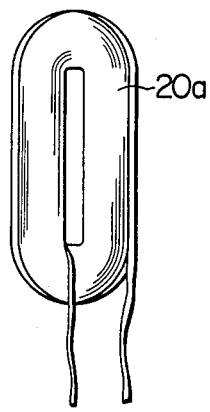
Figure 6A:
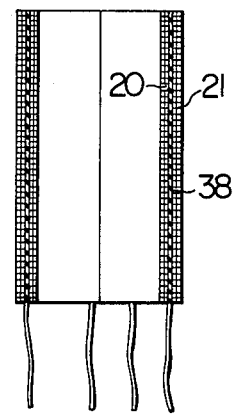
Figure 4B:
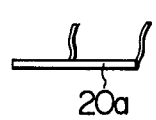
Figure 5B:
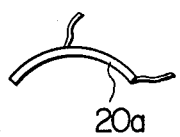
Figure 6B:
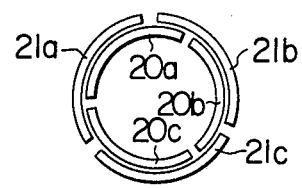

FIG. 6B is a bottom plan view of the completed drive coil assemblies 20 and 21. The radially inner coils 20a, 20b and 20c constitute the drive coil assembly 20 of one phase, and the radially outer coils 21a, 21b and 21c constitute the drive coil assembly 21 of the other phase. The coils 20a, 20b and 20c are connected in series so that they are of the same phase in the electromagnetic sense. Similarly, the coils 21a, 21b and 21c are also connected in series. These series connections of the coils are shown on the right-hand side of FIG. 8. In the first step of making these drive coil assemblies 20 and 21, an insulated conductor is would into an elliptical conifugration to provide each of the coils 20a to 21c as shown in FIGS. 4A and 4B which are an elevational view and a bottom plan view respectively. In the next step, each coil is bent into an arcuate shape as shown in FIGS. 5A and 5B which are an elevational view and a bottom plan view respectively. It is apparent that the radius of the radially inner coils 20a to 20c differs from or is smaller than that of the radially outer coils 21a to 21c. In the next step, the radially inner coils 20a, 20b and 20c are positioned along a circle with each extending over an angle of about 120°, and the radially outer coils 21a, 21b and 21c are also positioned along another circle with each extending over an angle of about 120°. In the next step, the radially inner and outer coils 20a to 21c are molded and sealed with a resin material with an insulating sheet 38 interposed therebetween. It is apparent that each of the radially inner coils 20a to 20c is displaced from the associated one of the radially outer coils 21a to 21c by an electric angle of 90°. These steps complete the drive coil assemblies 20 and 21 as shown in FIGS. 6A and 6B which are a longitudinal sectional view and a bottom plan view respectively. The external ends of the leads of the drive coil assemblies 20 and 21 shown in FIG. 6A are connected to the flexible circuit board 15 as described hereinbefore.

The manners of driving the motors, controlling the rotation speed of the motors and changing the direction of rotation of the motors will be described together with the motor speed-torque characteristic and the motor speed-current characteristic with reference to FIGS. 7, 8, 9 and 10.

Figure 7:
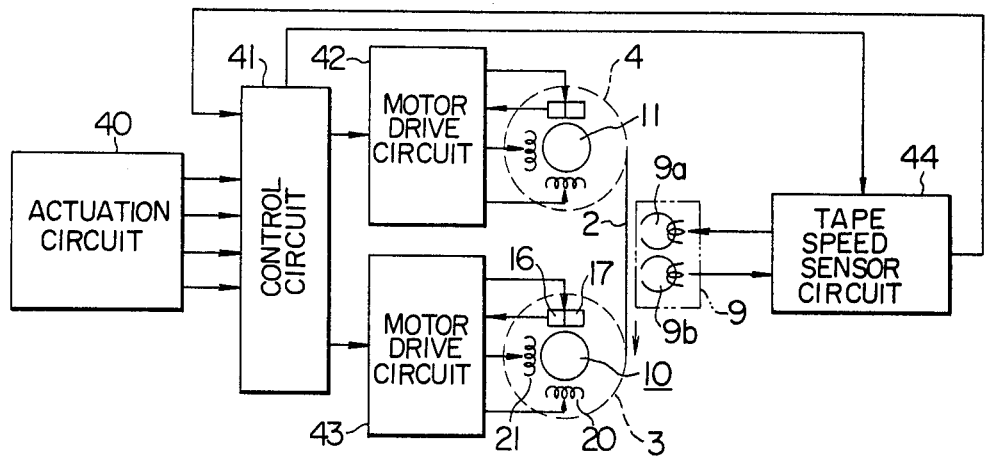
FIG. 7 is a block diagram of one form of the tape drive system preferably employed in the tape drive device according to the present invention.
Figure 8:
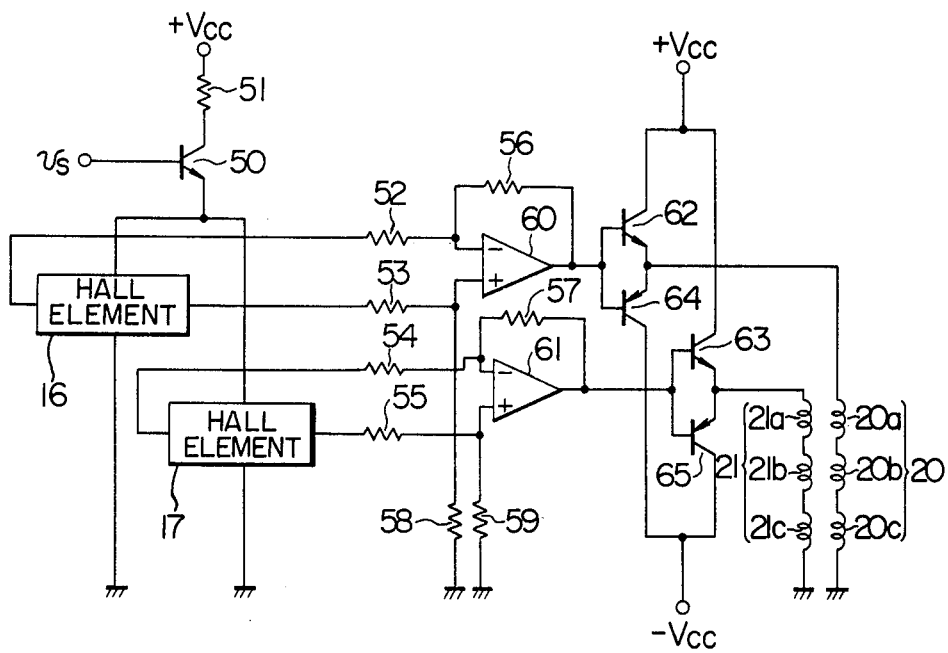
FIG. 8 is a circuit diagram of one form of the tape drive circuit shown in FIG. 7.

FIG. 7 is a block diagram of one form of the tape drive system preferably employed in the tape drive device according to the present invention. Referring to FIG. 7, one of the play mode, fast forward (FF) mode, rewind mode and stop mode is selected by actuating an actuation circuit 40. In response to the application of the selected mode signal from the actuation circuit 40, a control circuit 41 controls the operation of a supply motor drive circuit 42 and/or a take-up motor drive circuit 43. A tape speed sensor circuit 44 senses the tape speed on the basis of the input signal applied from the tape speed sensor head 9. FIG. 8 is a circuit diagram showing, by way of example, the practical structure of the take-up motor drive circuit 43 driving the motor 10 on the take-up side.

The principle of motor drive will first be described with reference to FIGS. 7 and 8. Referring to FIGS. 7 and 8, the Hall elements 16 and 17 have the function of sensing the angular position of rotation of the magnet 23 which is magnetized at its peripheral surface with the six poles of sector shape arranged in the order of, for example, N, S, N, S, N, S. In response to the variation in the strength of the magnetic field due to the rotation of the magnet 23, each of the Hall elements 16 and 17 generates a rotor position signal of substantially sinusoidal waveform. The rotor position signal appearing from the Hall element 16 is amplified by a differential amplifier composed of resistors 52, 53, 56, 58 and an operational amplifier 60, and the output signal from the differential amplifier is applied to the drive coil assembly 20 through a driver circuit composed of a pair of power transistors 62 and 64. The other Hall element 17 and the other drive coil assembly 21 are disposed at the positions displaced by the electric angle of 90° from the Hall element 16 and the drive coil assembly 20 respectively. Thus, the rotor position signal appearing from the Hall element 17 is similarly amplified by a second differential amplifier composed of resistors 54, 55, 57, 59 and a second operational amplifier 61, and the output signal from this differential amplifier is applied to the drive coil assembly 21 through a second driver circuit composed of a second pair of power transistors 63 and 65.

Figure 9A:
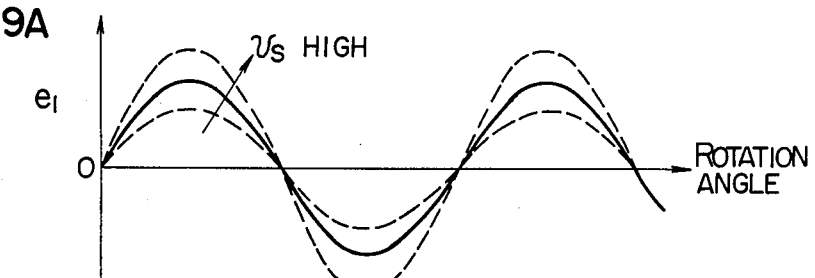
FIGS. 9A and 9B show waveforms of drive voltages applied to the two coil assemblies respectively in the circuit shown in FIG. 8.
Figure 9B:
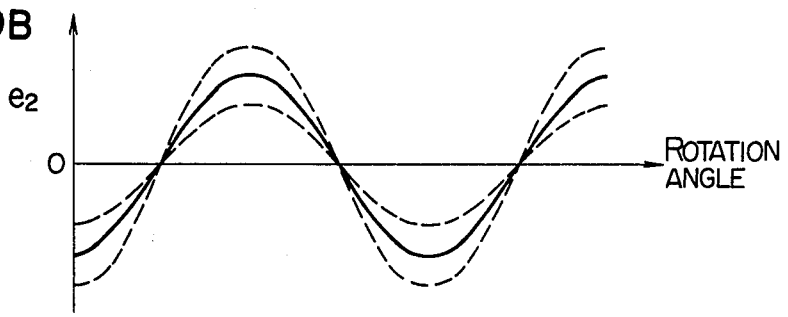

FIGS. 9A and 9B show the waveforms of drive voltages $e_1$ and $e_2$ applied to the drive coil assemblies 20 and 21 respectively in FIG. 8. It will be seen that the drive voltages $e_1$ and $e_2$ of sinusoidal waveform shifted by the electric angle of 90° relative to each other are applied to the drive coil assemblies 20 and 21 respectively. A transistor 50 is provided to supply a bias current or Hall current to the Hall elements 16 and 17. With the increase in the base potential $v_s$ of this transistor 50, the Hall current supplied from the transistor 50 increases. Since the output voltage appearing from each Hall element is approximately proportional to the Hall current supplied thereto, the drive voltages $e_1$ and $e_2$ applied to the respective drive coil assemblies 20 and 21 have their amplitudes increased correspondingly while maintaining the basic sinusoidal waveform. On the other hand, the drive voltages $e_1$ and $e_2$ have their amplitudes decreased when the base potential $v_s$ of the transistor 50 is lowered. Thus, by controlling the base potential $v_s$ of the transistor 50, the rotation speed of the take-up reel hub 5 can be freely controlled.

When, for example, the play mode is selected at the actuation circuit 40, the rotation speed of the motor 10 associated with the take-up reel hub 5 can be controlled to maintain constant the travelling speed of the tape 2 by feeding back the sensed tape speed signal from the tape speed sensor circuit 44 to the base of the transistor 50 through the control circuit 41.

When the FF mode is selected at the actuation circuit 40, the tape 2 can be fed fast forward by applying a high voltage to the base of the transistor 50 under control of the control circuit 41. When, on the other hand, the rewind mode is selected at the actuation circuit 40, the tape 2 can be rewound by applying a high voltage to the base of the transistor (not shown) in the supply motor drive circuit 42. Further, while the tape 2 is travelling at the constant speed by being driven by the motor 10 associated with the take-up reel hub 5, the motor 11 associated with the supply reel hub 6 may be so controlled as to impart a back tension to the tape 2 under control of the control circuit 41.

Figure 10:
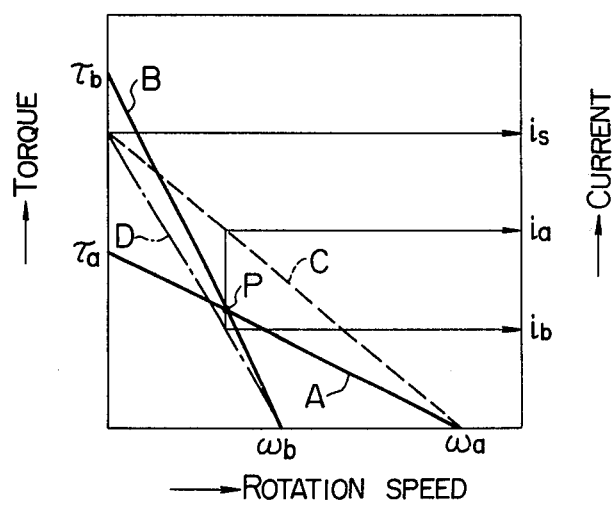
FIG. 10 is a graph showing the speed-torque characteristic and the speed-current characteristic in the embodiment shown in FIG. 2 and also those in the embodiment shown in FIG. 3.

FIG. 10 is a graph showing the motor speed-torque characteristic and the motor speed-current characteristic when the rotor unit of each motor is directly coupled to the associated reel hub as in the embodiment shown in FIG. 2 and also showing those when the rotor unit of each motor is coupled to the associated reel hub through the reduction gearing as in the embodiment shown in FIG. 3. Generally, the speed-torque characteristic and the speed-current characteristic of a DC motor can be represented by a straight curve. The solid curve A in FIG. 10 represents the motor speed-torque characteristic in the embodiment shown in FIG. 2, and the solid curve B represents that in the embodiment shown in FIG. 3. Suppose that no power transmission loss occurs in the reduction gearing and the rotation speed of the motor is reduced to 1/n, then, the stalling torque $\tau_b$ at the output shaft of the reduction gearing in the embodiment shown in FIG. 3 is n times as large as the stalling torque $\tau_a$ in the embodiment shown in FIG. 2. The dotted curve C in FIG. 10 represents the motor speed-current characteristic in the embodiment shown in FIG. 2, and the one-dot chain curve D represents that in the embodiment shown in FIG. 3 in which the reduction gearing is provided. In each case, the current value is approximately zero at the no-load rotation speeds $\omega_a$ and $\omega_b$, and the current value $i_s$ in the former is equal to that in the latter in the stalling stage. The symbol P in FIG. 10 designates the operating point. At this operating point P, the current value is $i_a$ in the embodiment shown in FIG. 2 and $i_b$ in the embodiment shown in FIG. 3. It will thus be seen that the current value $i_b$ is smaller than the current value $i_a$, and the same mechanical output can be obtained with less power consumption and better motor efficiency in the case of the embodiment including the reduction gearing than in the embodiment not including the reduction gearing.

It will be understood from the foregoing detailed description of the present invention that a cavity is formed in each of the reel hubs, and a motor including a rotor unit and a stator unit is disposed within this cavity for the effective utilization of the space occupied by the reel hubs. Therefore, the entire thickness of the tape drive device can be greatly reduced to contribute to the realization of the desired reductions in the volume, thickness and weight of portable information recording and reproducing apparatus.

What is claimed is:

1. A tape drive device including a reel hub for supplying or taking up a tape-shaped information recording and reproducing medium such as a magnetic tape or a film, said device comprising, at least:

(a) a reel hub formed with a cavity thereinside;
    (b) a motor received at least partly within said cavity formed in said reel hub, said motor including a rotor unit and a stator unit; and
    (c) coupling means comprising a reduction gearing for transmitting to said reel hub the rotating force generated by the rotor unit of said motor received within said cavity of said reel hub.

2. A tape drive device as claimed in claim 1, wherein said reduction gearing comprises a train of a plurality of gears.

3. A tape drive device as claimed in claim 1 or 2, wherein said rotor unit of said motor comprises a magnet magnetized at its peripheral surface with a plurality of magnetic poles and a shaft having said magnet fixedly mounted thereon, and said stator unit of said motor comprises at least one drive coil means disposed to substantially surround said magnet, a yoke having said drive coil means fixedly mounted thereon, and at least one Hall element sensing the angular position of rotation of said magnet.

4. A tape drive device as claimed in claim 3, wherein a second drive coil means and a second Hall element are provided in addition to said first drive coil means and said first Hall element for driving said motor by a two-phase AC voltage.

5. A tape drive device as claimed in claim 3 wherein said drive coil means of each phase comprises a plurality of elliptical coils connected in series, each of said coils being bent into an arcuate shape, and said first and second drive coil means are mounted on the inner wall surface of said yoke in concentric relation.

6. A tape drive device as claimed in claim 4 wherein said drive coil means of each phase comprises a plurality of elliptical coils connected in series, each of said second coils being bent into an arcuate shape, and said first and second drive coil means are mounted on the inner wall surface of said yoke in concentric relation.

7. A tape drive device including a reel hub for supplying or taking up a tape-shaped information recording and reproducing medium such as a magnetic tape or a film, said device comprising, at least:

(a) a reel hub formed with a cavity thereinside;
(b) a motor received at least partly within said cavity formed in said reel hub, said motor including a rotor unit and a stator unit, said rotor unit of said motor comprising a magnet magnetized at its peripheral surface with a plurality of magnetic poles and a shaft having said magnet fixedly mounted thereon, and said stator unit of said motor comprising at least one drive coil means disposed to substantially surround said magnet, a yoke having said drive coils means fixedly mounted thereon, and at least one Hall element sensing the angular position of rotation of said magnet; and
(c) coupling means for transmitting to said reel hub the rotating force generated by the rotor unit of said motor received within said cavity of said reel hub.

8. A tape drive device as claimed in claim 7, wherein said coupling means comprises a direct coupling between the rotor unit of said motor and said reel hub.

9. A tape drive device as claimed in claim 7, wherein a second drive coil means and a second Hall element are provided in addition to said first device drive coil means and said first Hall element for driving said motor by a two-phse AC voltage.

10. A tape drive device as defined in claim 7, wherein said drive coil means of each phase comprises a plurality of elliptical coils connected in series, each of said coils being bent into an arcuate shape, and said first and second drive coil means are mounted on the inner wall surface of said yoke in concentric relation.

11. A tape drive device as claimed in claim 9, wherein said drive coil means of each phase comprises a plurality of elliptical coils connected in series, each of said coils being bent into an arcuate shape, and said first and second drive coil means are mounted on the inner wall surface of said yoke in concentric relation.

* * * * *